United States Patent [19]
Killpatrick et al.

[11] Patent Number: 5,450,198
[45] Date of Patent: Sep. 12, 1995

[54] LASER GYRO MICROPROCESSOR BASED SMART MODE ACQUISITION AND HIGH PERFORMANCE MODE HOPPING

[75] Inventors: Joseph E. Killpatrick, Minneapolis; Dale F. Berndt, Plymouth; Keith R. Fritze, Long Lake, all of Minn.

[73] Assignee: Honeywell Inc., Minneapolis, Minn.

[21] Appl. No.: 134,368

[22] Filed: Oct. 1, 1993

[51] Int. Cl.$^6$ .......................................... G01C 19/66
[52] U.S. Cl. ...................................... 356/350; 372/94
[58] Field of Search ........................... 356/350; 372/94

[56] References Cited

U.S. PATENT DOCUMENTS

| | | |
|---|---|---|
| 3,581,227 | 5/1971 | Podgorski . |
| 4,152,071 | 5/1979 | Podgorski . |
| 4,267,478 | 5/1981 | Ljung et al. . |
| 4,320,974 | 3/1982 | Ljung . |
| 4,383,763 | 5/1983 | Hutchings et al. . |
| 4,597,667 | 7/1986 | Curby et al. . |
| 4,740,083 | 4/1988 | Curby et al. ........................ 356/350 |
| 4,755,057 | 7/1988 | Curby et al. ........................ 356/350 |
| 4,933,592 | 6/1990 | Priddy ................................ 310/332 |
| 5,074,664 | 12/1991 | Mark et al. ........................ 356/350 |
| 5,108,182 | 4/1992 | Murphy ............................. 356/350 |
| 5,225,889 | 7/1993 | Fritze et al. ....................... 356/350 |
| 5,309,459 | 5/1994 | Haovat .............................. 356/350 |

FOREIGN PATENT DOCUMENTS 10285723 12/1988 European Pat. Off. .

*Primary Examiner*—Samuel A. Turner
*Attorney, Agent, or Firm*—Craig J. Lervick

[57] ABSTRACT

A laser digital path length control method and apparatus for precisely controlling a laser path length to obtain a laser mode and change a laser mode. The invention uses a microprocessor to control a path length control circuit that continuously adjusts the position of path length control mirrors. The mirrors may be positioned in response to the microprocessor to acquire a particular mode of the laser or change the mode of the laser. While the gyro mode is changed the microprocessor increases the gyro run current to prevent loss of gyro function returning the current to its normal value following the mode change. The microprocessor adjusts the position of the two path length control mirrors such that total path length follows a predetermined or dynamic range. The invention allows the calculation of volts per mode of the laser by providing a means to monitor laser intensity as a function of voltage supplied to the laser path length controllers. The method and apparatus of the invention may be used in a laser gyro to improve system path length control and to help compensate for changes in system component parameters.

18 Claims, 16 Drawing Sheets

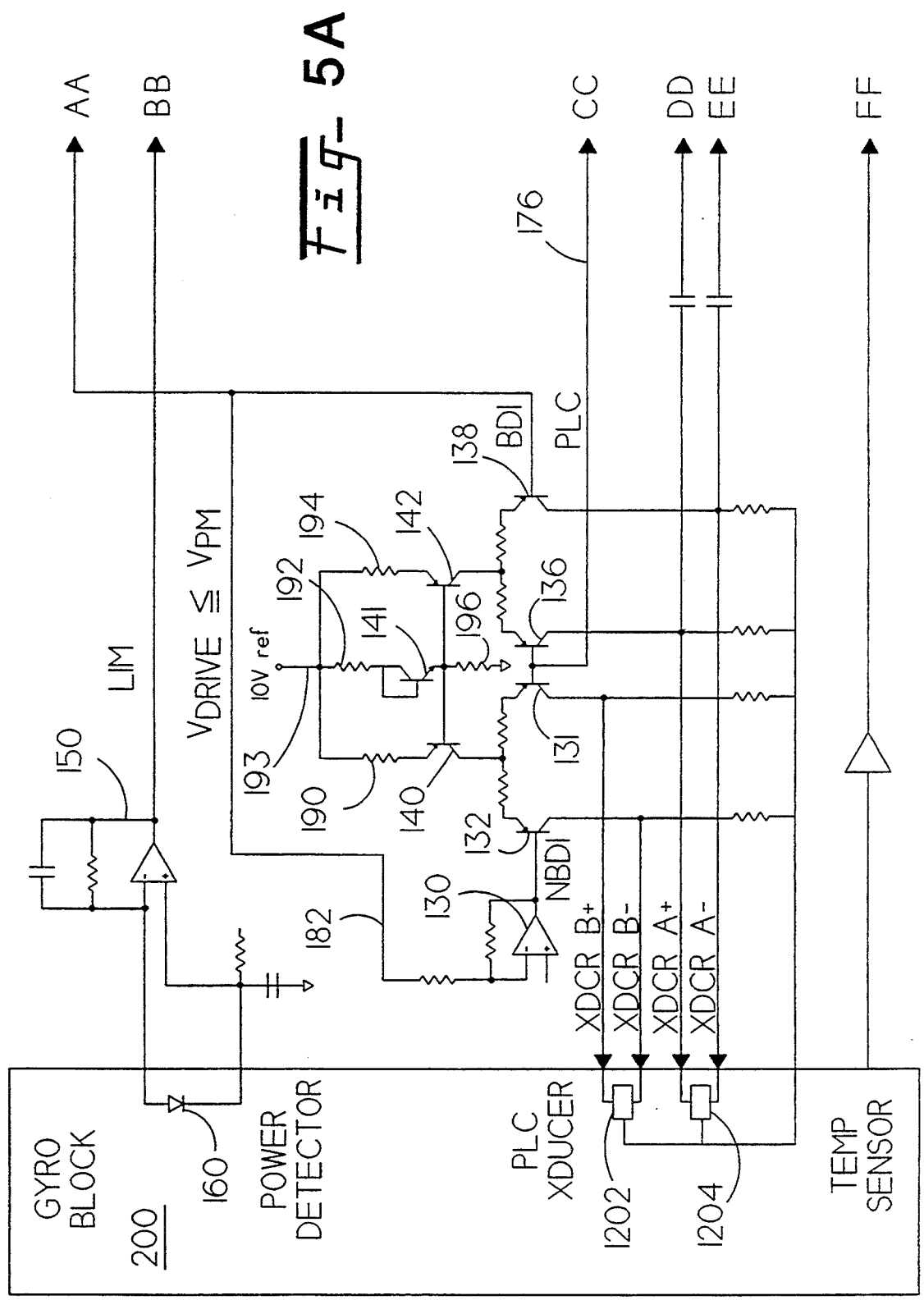

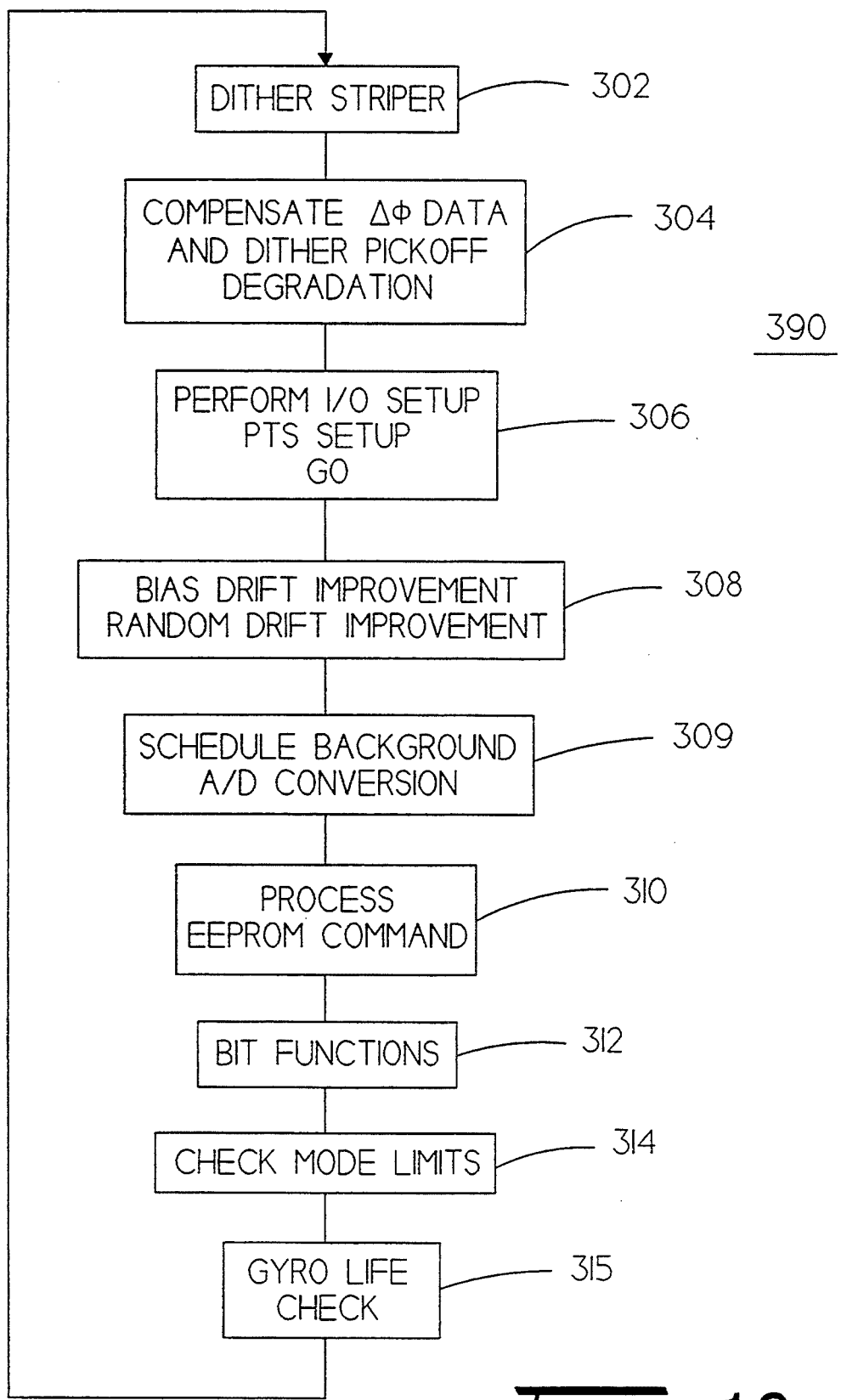

LASER GYRO MICROPROCESSOR BASED SMART MODE ACQUISITION AND HIGH PERFORMANCE MODE HOPPING

This invention relates to a method and apparatus for controlling a laser beam's path and more particularly to a method and apparatus for the control of a laser gyro's laser path length using a microprocessor based microcontroller to acquire a particular laser mode and move or hop from one mode to another mode while continuously maintaining gyro performance.

BACKGROUND OF THE INVENTION

Electro-mechanical systems have a dynamic behavior that is often dependent on temperature. Also, the dynamic behavior of these systems frequently changes over time. One class of electro-mechanical system known as laser angular rate sensors exhibit system dynamics that are also temperature and age dependent. One component of the laser angular rate sensor known as the path length controller is also affected by these changes.

Laser angular rate sensors, sometimes referred to as laser gyros, are well known in the art. A detailed description may be found in the "Background of the Invention" of U.S. Pat. No. 4,597,667, which is incorporated herein by reference. FIG. 1 shows schematically a laser gyro. Briefly, such sensors include a ring laser gyro 200 supported in a gyro block 5 having a plurality of gas containing tunnels (not shown). At the intersection of the tunnels are mirrors 13, 15, and 18 that define a closed-loop optical path 16 which is traveled by counter-propagating laser beams therein. Practical embodiments of laser angular rate sensors usually include a path length control (PLC) apparatus. The purpose of the path length control apparatus is to maintain a constant path length (usually multiples of the laser wavelength) for the counter-propagating laser beams. Maintaining a constant path length avoids false rotation errors from the laser gyro. The path length control function is usually provided by an arrangement wherein at least one of the mirrors is attached to a piezoelectric transducer which controls translational movement of the mirror. This transducer effects the laser beam path length in response to a drive signal provided through a transducer drive amplifier. In the example shown in FIG. 1 mirrors 13, 15 are path length control mirrors. Mirrors 13, 15 move along paths represented by lines 12, 14 in response to path length control signals.

One technique for maintaining a constant path length is detecting the intensity of one or both of the laser beams and controlling the path length of the ring laser such that the intensity of one or both of the beams is at a maximum. U.S. Pat. No. 4,152,071, which issued May 1, 1979 to T. J. Podgorski and is assigned to the assignee of the present invention, illustrates a control mechanism and circuitry as just described. Path length transducers for controlling the path length of the ring laser are well known, and particularly described in U.S. Pat. No. 3,581,227, which issued May 25, 1971 to T. J. Podgorski, also assigned to the assignee of the present invention, U.S. Pat No. 4,383,763, which issued May 17, 1983 to Hutchings et al and U.S. Pat. No. 4,267,478, which issued May 12, 1981 to Bo H. G. Ljung, et al. All these patents are incorporated herein by reference.

In the aforementioned patents, the beam intensity is either detected directly as illustrated in the aforementioned patents, or may be derived from what is referred to as the double beam signal such as that illustrated in U.S. Pat No. 4,320,974, which issued on Mar. 23, 1982 to Bo H. G. Ljung, and is also incorporated herein by reference.

In path length control systems of the prior art, the path length controller finds mirror positions for which the lasing polygon path length, i.e., the ring laser path length, is an integral number of wavelengths of the desired mode or frequency, as indicated by a spectral line, of the lasing gas.

Herein mode is defined as the equivalent of one wavelength of the laser beam. For a helium-neon laser, one mode is equal to 0.6328 microns which is equal to 24.91 microinches. With proper design, the path length control forces the path length traversed by the laser beams to be a value which causes the laser beams to be at maximum power.

Path length control functions may be differentiated between different phases of laser gyro start up. Initially when the laser is started the path length controllers are used to help guide the laser into a useful mode that provides good dynamic response for other active parameters of the laser gyro, such as laser output, gyro dither and bias control. After start up, path length control helps compensate for temperature and aging effects as described above.

In prior art designs, start up path length control was accomplished with the aid of a predetermined set point of the pick off voltage and the use of a voltage sweep. The desired set point was specified when the laser gyro was constructed. The laser gyros of the prior art had difficulty adjusting to two common effects, temperature fluctuations and fluctuations in system response due to aging. Therefore it is the motivation of the invention to provide a dynamic compensation mechanism capable of acquiring a particular laser mode, calculating volts per mode, and changing laser modes.

SUMMARY OF THE INVENTION

The invention provides, for a laser gyro, a smart mode acquisition and mode hopping path length controller that exploits the ease of use and flexibility of a digital controller. A digital controller provides a pulse width modulation signal, a digital signal for mode acquisition, and digital signals for a synchronous phase demodulator used to close the feedback loop that maintains the laser at a predetermined mode. The digital controller may implement path length control improvements such as mode acquisition, and mode hopping. The digital controller may be used to slew through modes looking for the volts per mode of the gyro system.

It is an object of the invention to provide an improved laser gyro that utilizes a digital controller to acquire a laser mode.

It is a further object of the invention to provide an improved laser gyro that utilizes a digital controller to mode hop.

It is yet a further object of the invention to provide a method of computing the volts per mode of a laser gyro.

It is a further object of the invention to provide uninterrupted and excellent gyro output performances while mode hopping.

Other objects, features and advantages of the present invention will become apparent to those skilled in the art through the Description of the Preferred Embodiment, Claims, and Drawings herein wherein like numerals refer to like elements.

BRIEF DESCRIPTION OF THE DRAWINGS

To illustrate this invention, a preferred embodiment will be described herein with reference to the accompanying drawings.

FIG. 12 shows the method of monitoring the modular gyro with a monitor control loop.

DESCRIPTION OF THE PREFERRED EMBODIMENT

Figure 2:
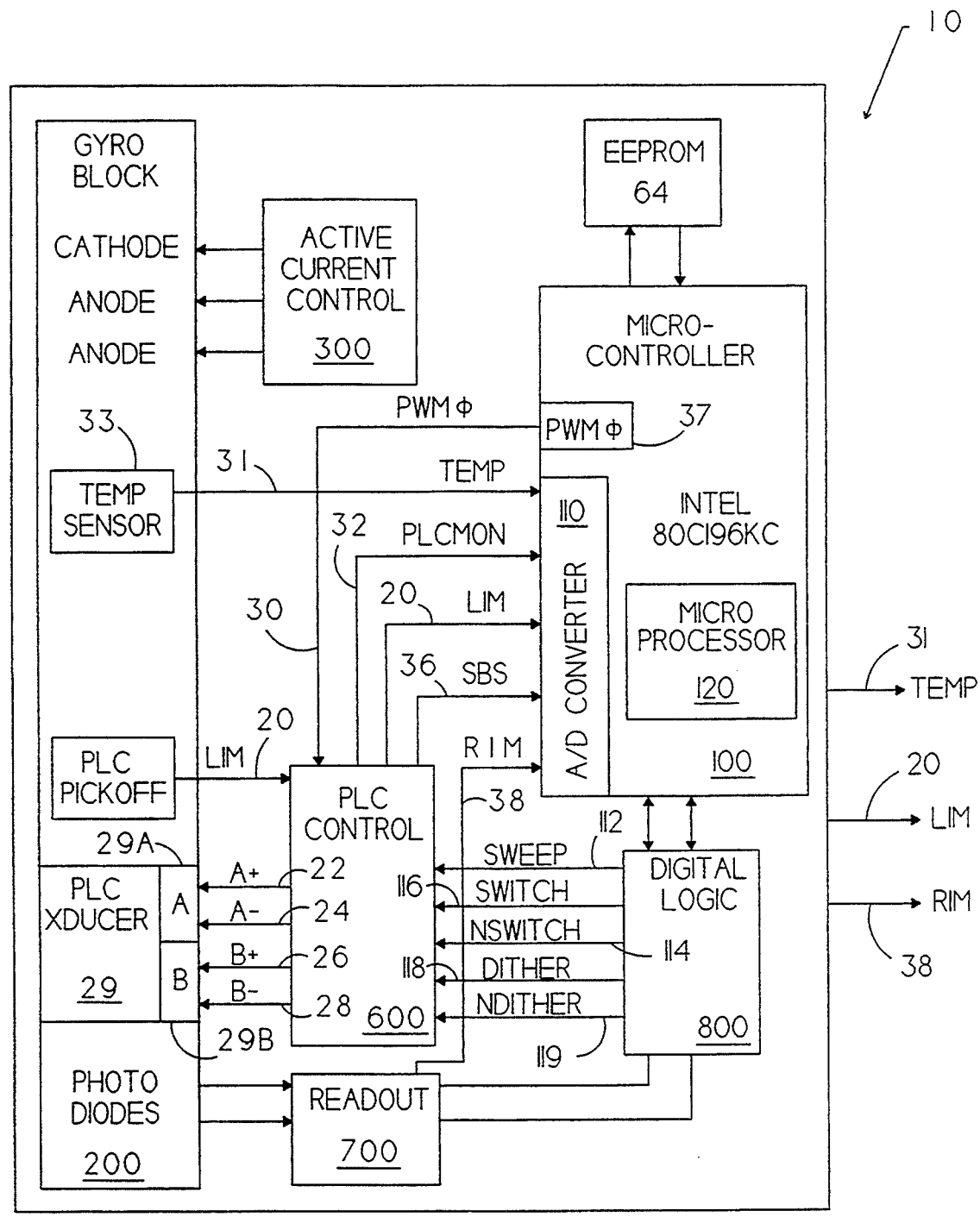
FIG. 2 shows a block diagram of one embodiment of a laser gyro employing the novel features of the present invention.

Refer now to FIG. 2, FIG. 2 shows a block diagram of one embodiment of a modular laser gyro employing the novel features of the present invention. The instant invention will be explained by way of example embodiments. Those skilled in the art having the benefit of this disclosure will appreciate that the examples herein are by way of illustration of the principals of the invention and not by way of limitation.

Laser gyro 10 includes a controller 100, a laser gyro block 5, an active current control 300, a PLC apparatus 600, a photo diode readout system 700, and digital logic 800. The modular laser gyro apparatus of the invention is implemented in one example embodiment with a microcontroller serving as controller 100. The path length control system 600 of the instant invention forms a closed loop system comprising a laser intensity monitor LIM signal 20 serving as the primary laser performance signal. The LIM signal 20 connects to the PLC apparatus 600 which provides a path length control monitor PLCMON signal 32, LIM signal 20, and single beam signal SBS 36 which is connected to the microcontroller 100 through analog to digital converter 110. The PLC apparatus 600 is further described below with reference to FIGS. 4 and 5. Digital logic apparatus 800 provides a sweep signal 112, switch signal 116, not switch signal 114, dither signal 118 and notdither signal 119 to the path length control apparatus 600. The microcontroller 100 provides control of the path length transducers through the digital logic apparatus 800.

The microcontroller 100 provides control of the A mirror 13 PLC transducer 29A through A+ signal 22 and A− signal 24, and control of the B mirror 15 PLC transducer 29B through B+ signal 26 and B− signal 28. Signal [(A+)−(A−)] are differential signals to transducer A. If [(A+)−(A−)] is positive the path length around the gyro is increased. If [(A+)−(A−)] is negative the path length around the gyro is decreased. This is also the case for transducer B.

The A/D converter 110 may be integral to the controller 100 and may advantageously be a 10 bit A/D converter. The controller may also advantageously include a microprocessor 120. The operation of the invention is discussed in more detail below.

In one embodiment of the invention a microcontroller 100 is comprised of the Intel 80C196KC Microcontroller. The microcontroller 100 contains three pulse width modulators which in this embodiment of the invention are used for various control functions. The first pulse width modulator PWM0 37 is used for controlling the path length control apparatus 600.

A number of software modules are involved in the initialization and control of the microcontroller 100. The software modules are run by the microprocessor 120 contained within the microcontroller 100. Shown in FIG. 12 is a monitor control loop which is the main process execution loop for the digital modular gyro 10. The monitor control loop 390 first shows the execution of the dither stripper algorithm 302. The compensation of the rotational inertial navigation data for temperature, and bias drift occurs next in step 304. The monitor control loop 390 performs I/O set up for the system in 306. The monitor then executes the bias drift improvement and random drift improvement step in 308. The process schedules a background A/D conversion at step 309. The process then flows to 310 where ally commands given by an outside system for the modular gyro are processed. The process executes a built-in test function at step 312 and checks laser mode limits in process 314 which is described in more detail with reference to FIG. 9. The process performs a gyro life check at step 315. The monitor control loop 390 then repeats this set of processes until the modular gyro 10 is shut down.

Figure 3:
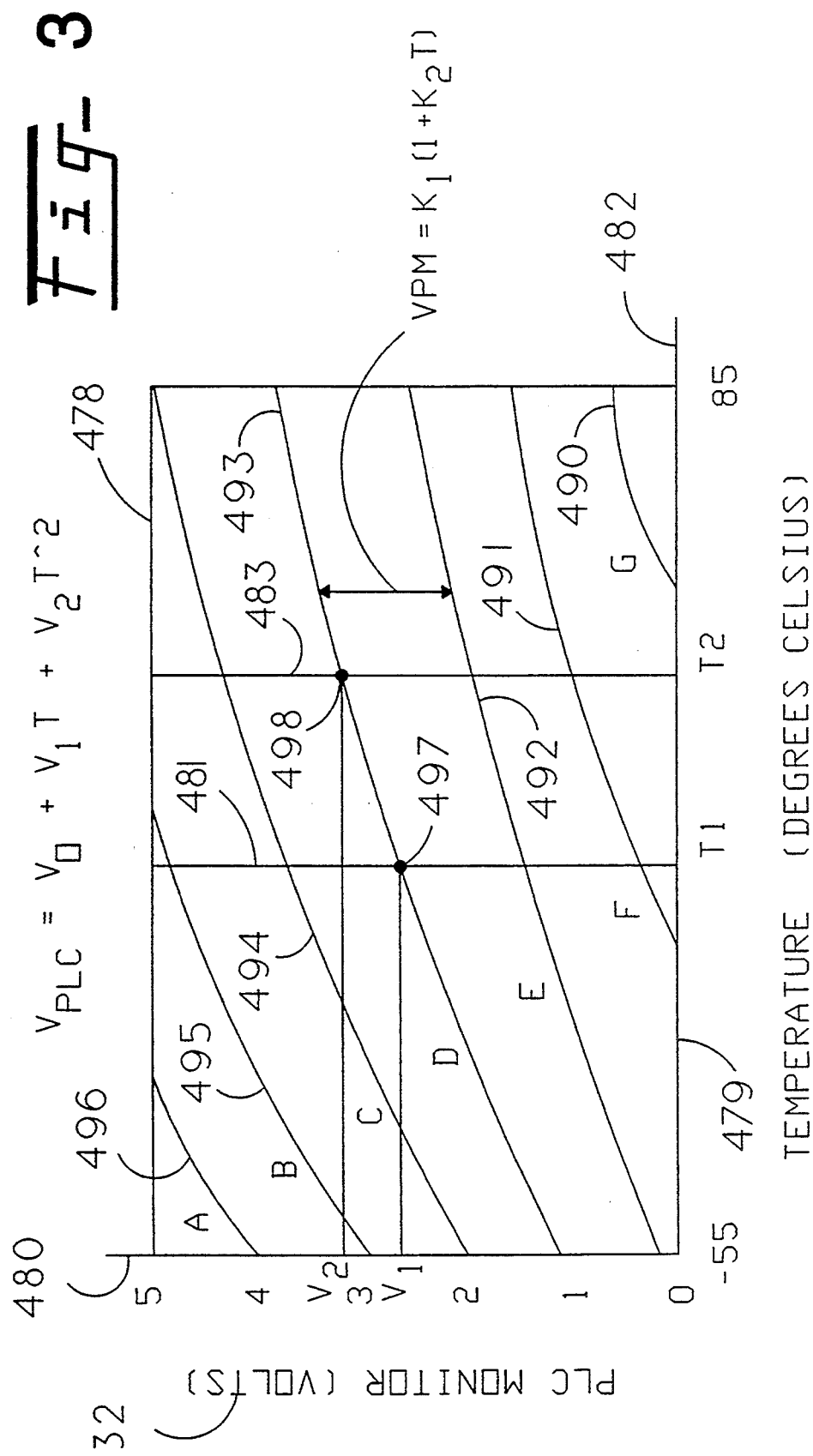
FIG. 3 shows a plot of a peak laser mode (Peak LIM OUT) vs. output voltage for varying temperature ranges.

Operating modes of the laser gyro 200 are dependent on temperature. Temperature fluctuations in gyro mode are illustrated in FIG. 3. FIG. 3 shows the behavior of path length control monitor voltage PLCMON 32 as it depends on temperature. A local peak, or maximum, in LIM is defined as a mode and is plotted as a parameter in terms of PLC monitor volts and as a function of temperature. Temperature is shown on the horizontal axis 482 which indicates increasing temperature to the right. PLC monitor voltage 32 is shown on the vertical axis 480 which indicates increasing PLC monitor output voltage toward the top of the graph.

FIG. 3 shows seven modes of one example embodiment of the laser gyro 10 of the invention as modes G through A numbered 490 through 496 respectively.

FIG. 3 also shows two operating points of the laser gyro 497 and 498. It can be seen from FIG. 3 that as the temperature of the laser gyro changes so does the operating point of each mode. Lines 481 and 483 are provided to illustrate the effect of an increase in temperature from T1 to T2. Lines 481 and 483 intersect a number of mode curves providing several operating modes for the laser gyro at T1 and T2 respectively. Points 497 and 498 are provided to illustrate the effect a change in temperature has on the mode voltage 480. The laser gyro 10 is assumed to be operating on mode D, alternately known as the primary mode, at operating point 498.

While operating at T1 the path length control monitor voltage PLCMON 32 is shown in FIG. 3 to be V1 on axis 480. As the laser gyro changes temperature from T1 to T2 the PLCMON 32 voltage changes from V1 to V2 changing the operating point of the gyro to operating point 498 corresponding to PCLMON 32 voltage of V2. As the PLCMON 32 voltage swings through its minimum voltage 479 to its maximum voltage 478 the available modes at any given temperature changes such that not all modes are available at every temperature. Therefore a need may arise, as the temperature changes, to hop a mode.

Figure 4:
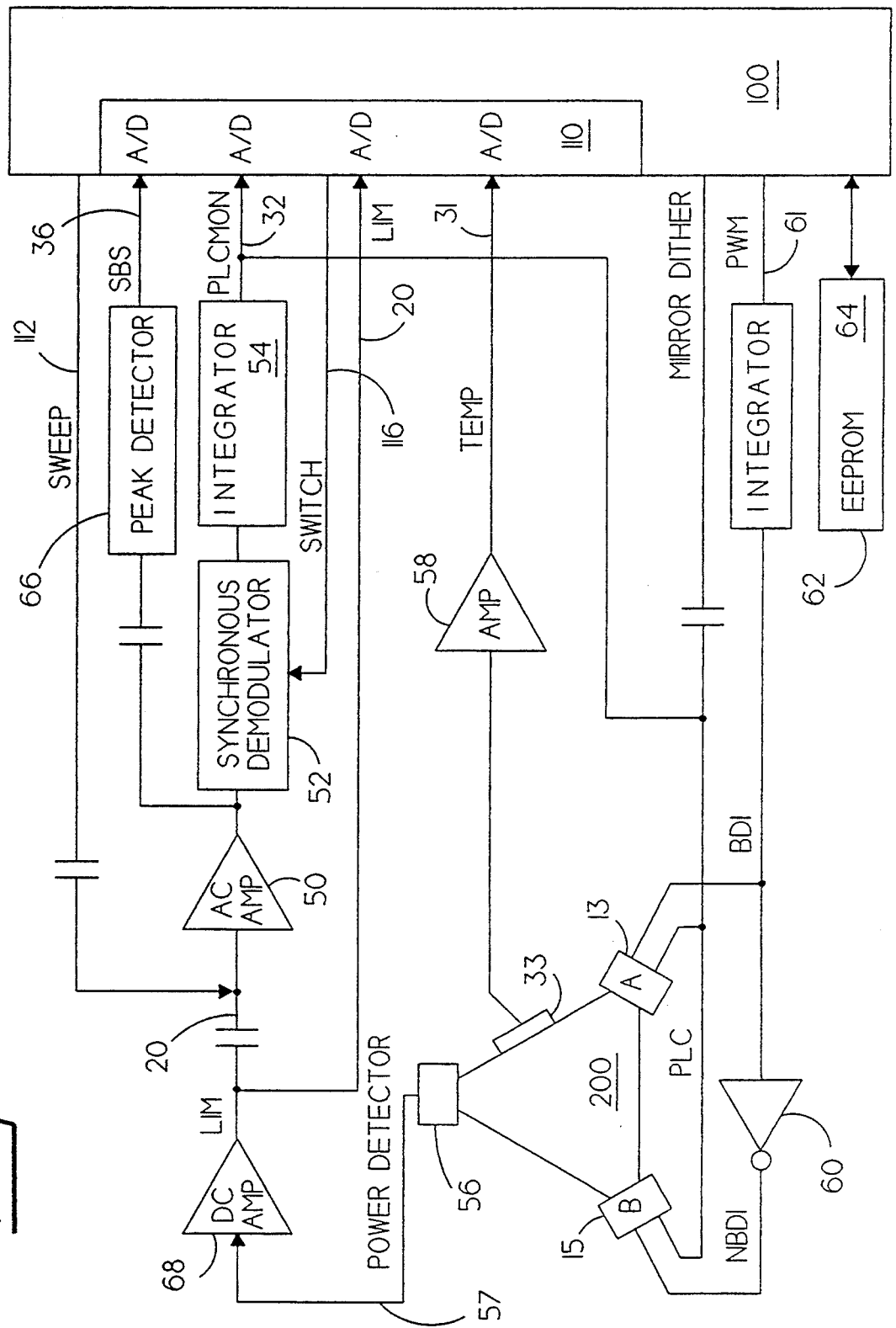
FIG. 4 shows a high level schematic circuit diagram of the apparatus of the invention to acquire a particular mode and mode hop.

Now referring to FIG. 4 which shows the apparatus of the invention to acquire a lasing mode and to hop lasing modes. The apparatus of the invention controls the path length transducers for mirror A and mirror B of the laser gyro 200. The laser block has a number of sensors including a temperature sensor 33 which sends a temperature signal. The temperature signal is amplified by temperature sensor amplifier 58 which provides a temperature signal 31 to the on board A/D converter 110. The temperature signal 31 is used by the microprocessor to perform mode acquisition and mode hopping functions which follow the curves of FIG. 3.

The laser gyro 200 also has a power detect signal 57 which is picked up from photo diode 56 connected to DC amplifier 68. The photo diode 56 provides the laser intensity monitor (LIM) signal 20. The laser gyro 200 transducer mirrors A and B provide the principle means by which path length control is achieved. As the laser path is adjusted with the path length control transducers the laser intensity monitor signal 20 may vary. The invention provides a number of components that help process the laser intensity monitor signal into a useful set of signals including the laser intensity monitor signal 20, a path length control monitor signal 32 and a single beam signal 36.

The AC amplifier 50 sees the AC component of the laser intensity monitor 20. The output of the AC amplifier 50 is sent to a synchronous demodulator 52 which provides a signal to an integrator 54 which generates the path length control monitor signal PLCMON 32. The output of the AC amplifier 50 is also AC coupled to a peak detector 66 which provides a single beam signal 36. The AC amplifier 50 also has as an input from the sweep signal 112 which is synchronized to the switch signal 116. The synchronous demodulator 52 also provides a method by which the closed loop path from the laser intensity monitor through to the path length control monitor may be used to adjust the path length.

The microcontroller 100 provides a biased drift improvement signal on line 61 to integrator 62 and inverter 60.

The high level circuit diagram of FIG. 4 illustrates the method of the invention to control path length. The synchronous demodulator provides a way of controlling the path length mirrors in a fashion such that the path length control transducers are continuously looking for the peak of a laser mode. The various laser modes of the laser gyro of the invention are shown in more detail in FIG. 3.

Figure 5B:
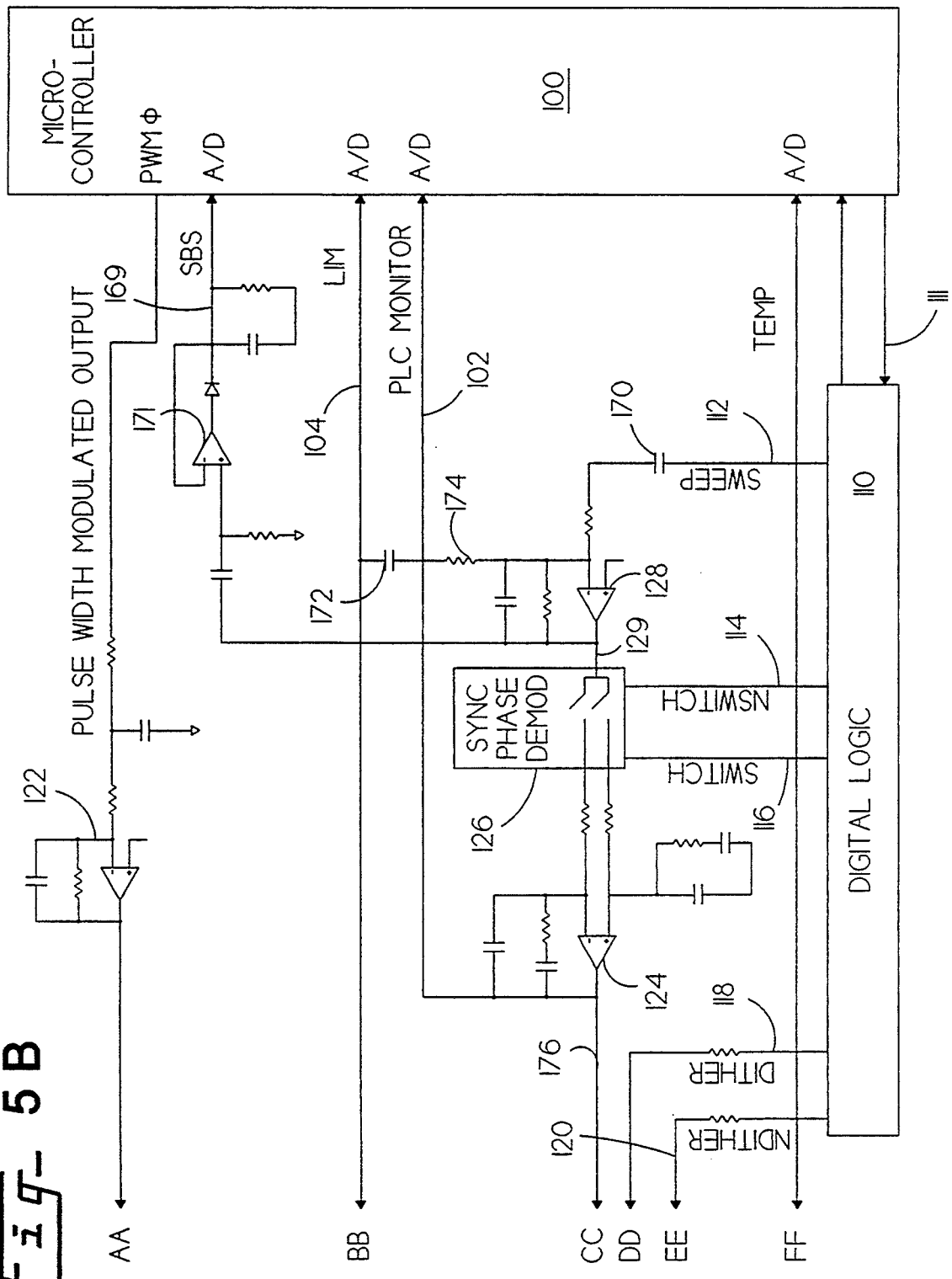
FIG. 5 shows a detailed schematic circuit diagram of the apparatus of the invention to acquire a particular mode and mode hop.

Shown in FIG. 5 is one embodiment of a path length controller as employed in one example of the invention used to step through a number of modes of the laser. The path length controller of FIG. 5 comprises digital logic 110, a sweep line 112, a first switch line 114, a second switch line 116, a first dither line 118, a second dither line 119, a first integration amplifier 122, a second integration amplifier 124, a synchronous phase demodulator switch 126, an amplifier 128 and an amplifier 130. Also included are a first set of driving transistors 136, 138 and a second set of driving transistors 131, 132.

The sweep line 112 supplies a 3 Khz signal during start up of the laser gyro 200. The sweep line 112 carries a signal designated SWEEP. The two switching lines 114, 116 also supply 3 Khz signals to the switch 126 wherein the first switching line 114 is 180° out of phase with the second switching line 116. The switching lines in one example are designated SWITCH (SW) and NOTSWITCH (NSW) respectively. Similarly, the dither lines 118, 119 are designated DITHER (D) and NOTDITHER (ND) respectively. The dither lines also supply a 3 Khz signal from the digital logic 110 wherein the 3 Khz signals are 180° out of phase with each other.

In operation the digital logic turns on the sweep line 112 in response to a start up command from the controller 100 on control line 111. At the same time the digital logic turns off the DITHER 118 and NOTDITHER 119 lines during the time the SWEEP signal is applied. When the gyro has swept to the desired laser mode, the SWEEP signal is removed and the DITHER and NOTDITHER lines 118, 119 are enabled.

The sweep line 3 Khz signal is also related to the SWITCH and NOTSWITCH signals 116, 114. The sweep line 3 Khz signal is in phase with one of the switch signals depending upon the mode to be swept, up or down. The 3 Khz SWEEP signal is connected through an AC coupling capacitor 170 to the inverting input of the first amplifier 128. The signal is then routed through switch 126 to the inverting or non-inverting input of the second integration amplifier 124. In operation, if the SWEEP signal is in phase with the switch signal 116, the output of the amplifier 128 is routed through the non-inverting input of integration amplifier 124. If the SWEEP signal is in phase with the NSW or NOTSWITCH signal line 114, the SWEEP signal is routed through the inverting input of integration amplifier 124. Those skilled in the art, having the benefit of this disclosure, will recognize that these relationships may be manipulated in various combinations to produce substantially similar results.

The SWEEP signal is left on for a long enough period of time such that the output of the integrator at signal line 176 achieves a high enough voltage for the modular gyro to sweep to a predetermined mode. Signal line 176, designated as a PLC monitor signal, is monitored by the microprocessor controller 100 at A/D input 102.

Control line 111 provides control signals to the digital logic device 110 to substantially switch the operational mode of the path length controller from sweep to running mode. The method used for acquiring a desired mode is explained further in detail below.

Also supplied to the controller 100 is the laser intensity monitor signal ("LIM") at A/D input 104. The laser intensity monitor signal is picked up from photodetector 160 in the gyro block 5. The signal is amplified by transimpedance amplifier 150 and sent to the controller. The LIM signal 104 is AC coupled by capacitor 172 and fed back to the first amplifier 128 through the inverting input. Note that the RC circuit comprising capacitor 172 and resistor 174 are constructed as a high pass filter to allow the 3 Khz dithering signal to pass to the non-inverting input of amplifier 128. Therefore, in the sweep mode, that is usually on during start-up of the laser gyro, when the DITHER and NOTDITHER lines 118 and 119 are turned off, any LIM signal components are blocked by capacitor 172 from appearing on the non-inverting input of amplifier 128.

Figure 1:
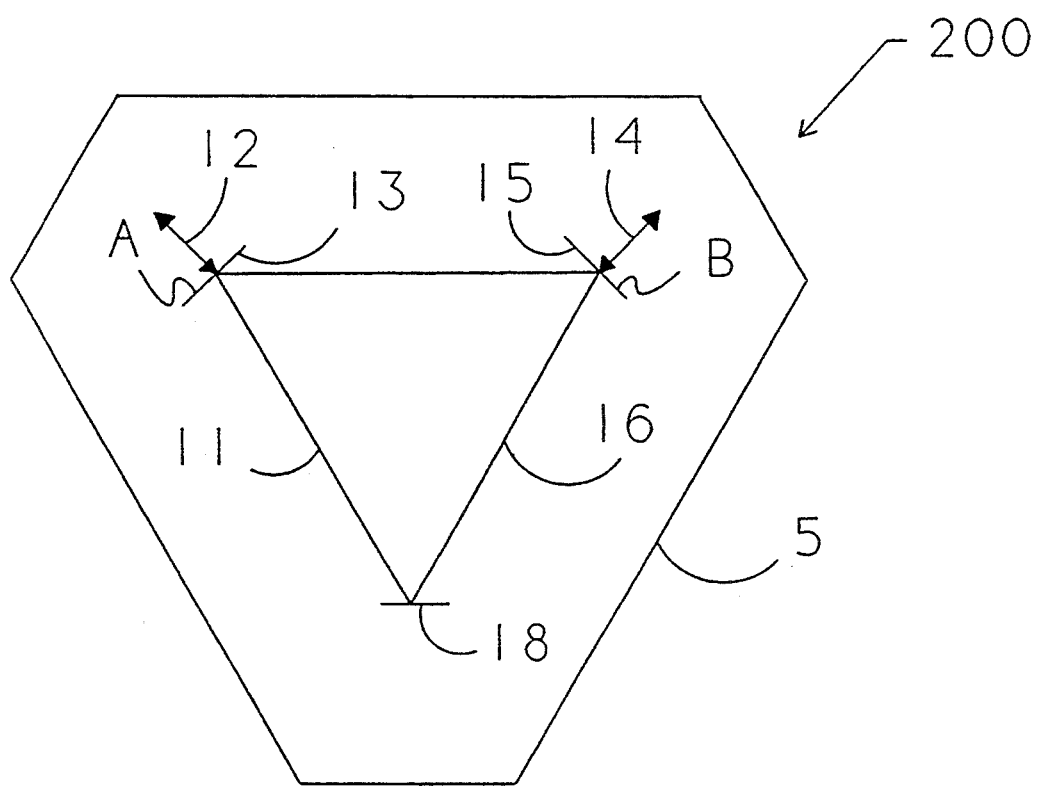
FIG. 1 shows a schematic block diagram of one embodiment of a laser gyro.

The controller 100 continuously outputs a pulse width modulation signal PWM0 into the first integration amplifier 122. This PWM0 signal is converted by integration amplifier 122 into a differential drive signal which is applied to the transistor drivers 132 and 138 in opposite polarities. The first component of the drive signal is applied to transistor 138. The second component 182 of the drive signal is applied through amplifier 130 to transistor 132 to drive a second transducer in the gyro block. The PLC signal from the second integration amplifier 124 drives transistors 134 and 136 and the PLC signal together with the path length control signals operating in pairs to differentially drive two sets A and B of transducers in the gyro which are connected to two mirrors 13 and 15 in the gyro block shown in FIG. 1. In FIG. 5, the transducer drivers are shown as elements 1202 and 1204 by their representative capacitances. In practice, as is well known, these are typically piezoelectric elements. Piezoelectric transducers elements 1202 and 1204 have center taps that are connected to the most negative voltage (−280 volts). In this way the piezo elements never see a reverse voltage polarity which reduces hysteresis effects.

In one embodiment of the invention a constant current source comprising transistors 140 and 142 together with resistive components 190, 192, 194 and 196 is arranged to provide a current of about 0.4 ma into each leg of the transducer differential driving transistor pairs (131, 132) and (136, 138).

The differential transistor pairs slowly drive the DC position of the transducers to the desired position based on the SWEEP signal or the AC induced dither signal for seeking the peak LIM signal. The PWM0 pulse width modulated signal is used only to move the mirrors differentially for BDI and RDI. The synchronous phase demodulator continues to seek the peak LIM signal based on the phase of the amplified LIM signal 129.

Now that the structure of the invention has been described, the theory of operation of the invention will be discussed.

FIG. 5 shows a detailed circuit schematic for path length control, optimal mode acquisition, and mode hopping. During mode acquisition and mode hopping the bias drift improvement BDI pulse width modulation signal is set at 50% so that the output of integration amplifier 122 is 2.5 volts at midrange. The output of integration amplifier 122 is inverted through amplifier 130 which is also set at 2.5 volts. Both the BDI and not BDI signal, NBDI, may be midrange at 2.5 volts during both mode acquisition and mode hopping for ease of explanation but this is not required.

The PLC uses the digital logic 110 to generate the dither drive to the mirrors. During mode acquisition and mode hopping, the sweep signal 112 is enabled and notdither 119 and dither 118 are disabled. The switch signal 116 and not switch signal 114 are always enabled at a 3 Khz rate. These signals are digital logic levels. Dither 118 is the complement of notdither 119 and switch 116 is the complement of not switch 114. If the sweep 112 is in phase with switch 116 then the path length controller signal 176 is swept up. If sweep 112 is 180° out of phase with switch 116 then the path length controller signal 176 is swept down.

The dither signal and notdither signal introduce a small displacement in mirror position by AC coupling a small 90° phase shifted signal into transducer A associated with mirror 13 only. This enables the circuit of FIG. 5 to lock in on a local maximum. The smart mode acquisition brings the circuit close to the local maximum LIM signal 20 and the dither part of the circuit locks in on the exact peak. The dither and notdither signal results in a small modulation in the power signal from the power detector 160. This small modulation shows up as an AC component on top of the DC component of the LIM signal 104 and is AC coupled through capacitor 172. The signal then goes through register 174 to the summing junction of amplifier 128 which amplifies by a gain of 150K/5.36K. This signal 129 is then fed into the synchronous phase demodulator 126.

The synchronous phase demodulator 126 provides a sweep up signal on line 176 if signal 129 is in phase with the switch signal 116 and provides a sweep down signal on line 176 if signal 129 is out of phase with the switch signal 116.

The PLC differential amplifier pairs comprise transistors 131, 132, 136 and 138. In one example embodiment of the invention the four transistors are PNP transistors from Motorola, part number MMBT6520. In one embodiment of the invention the transistors have a maximum collector voltage of 350 volts, derated to 280 volts. One advantage of using PNP's over NPN's is that PNP's have higher beta parameters for lower current and at lower temperatures which lowers the power consumption of the modular gyro. Another advantage of this example is that constant current source transistors 140 and 142 are low voltage, "off the shelf," surface mounted PNP's. The current through transistors 140 and 142 are set up by two current source resistors, 190 and 194 respectively. The voltages of the bases of transistors 140 and 142 are set up by the network resistor 192, transistor 141, and resistor 196. Transistor 141 is added for temperature compensation so that the base emitter drop tracks between all three transistors, 140, 141, and 142. The invention maintains a relatively constant current source over the operating temperature range of the laser gyro using transistors 140, 141 and 142. The invention also uses a 10 volt reference 193. The prior art simply used a fixed resistor as a current source which made the transducer voltage a non-linear function of the PLC monitor voltage 176. Thus the present invention allows the calculation of volts per mode to be independent of the PLC voltage range.

The integration amplifier 124 uses a pole and zero compensation technique to match the pole that is created by the one megohm resistor and the base collector capacitance of transistors 136 and 131. This widens the closed loop frequency response of the closed loop system.

A peak detector 171 is added to the output of amplifier 128 which is filtered before it goes into the A/D converter 110 to provide the SBS signal 169.

Figure 6:
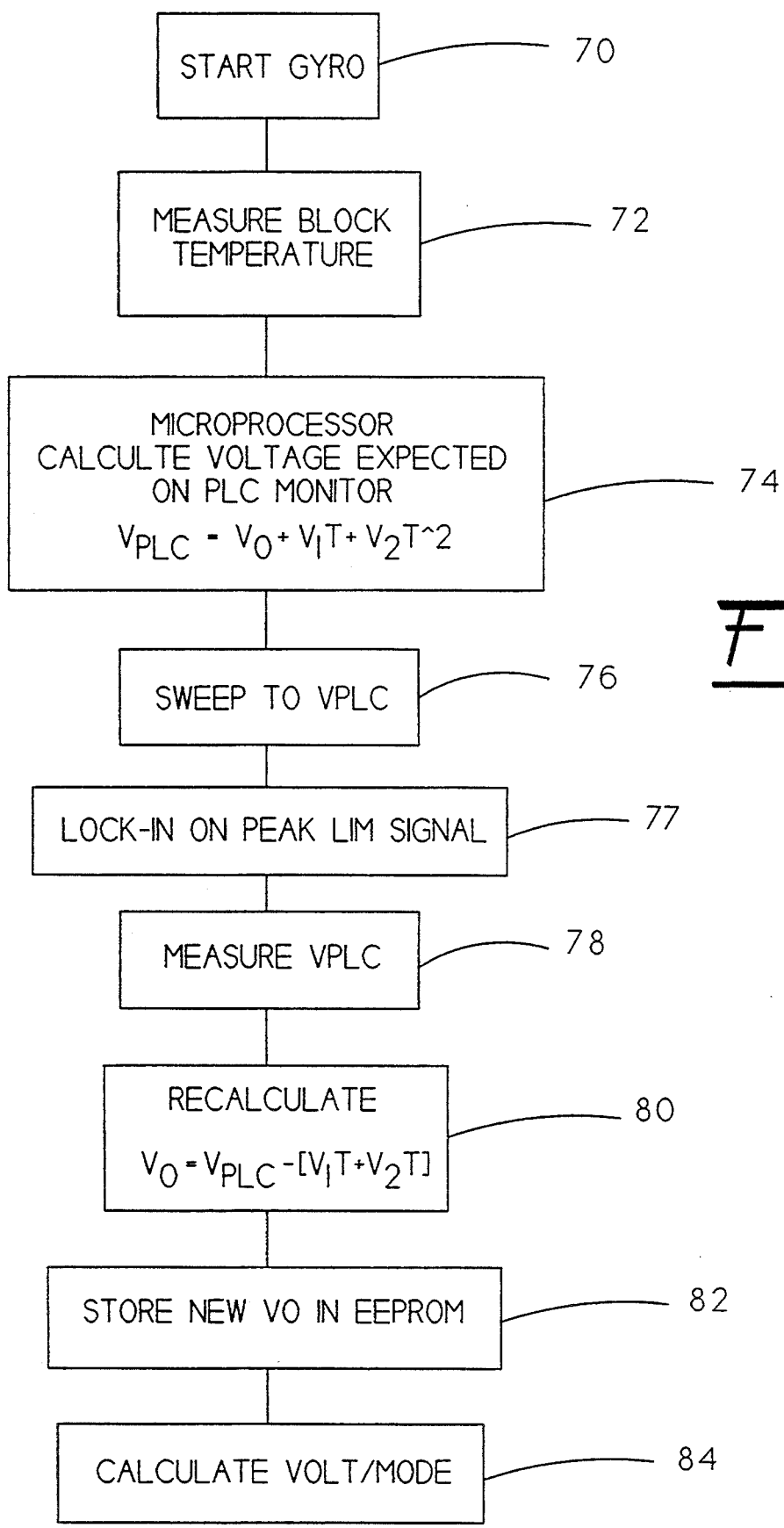
FIG. 6 shows a process flow diagram of the smart primary mode acquisition method of the invention.

FIG. 6 shows a schematic block diagram of the method of acquiring a primary laser operating mode. The method is implemented in a microcontroller 100 and is stored in the microprocessor 120 program memory. The method of finding the primary mode is useful upon gyro start-up to find which initial mode to operate the gyro on. FIG. 3 illustrates that there are a number of modes on which the gyro may be operated, and the job of the primary mode acquisition method defines the best mode for operating over the entire temperature range.

The process shown in FIG. 6 begins by starting the gyro in step 70. The process then measures the block temperature in step 72. The microprocessor 120 then calculates the voltage expected from the PLC monitor according to the equation $V_{PLC}$ equals the constants $V_0$, $V_1$, $V_2$ and $V_3$ used in the quadratic equation $V_{PLC} = V_0 + V_1 T + V_2 T^2 + V_3 T^3$ where T is the measured temperature of the block. The initial $V_0$, $V_1$, $V_2$ and $V_3$ parameters are provided from measurements of the laser gyro 200 done when the gyro is constructed at the factory. The constants used in the method of the invention known as $V_0$, $V_1$, $V_2$, $V_3$, $K_1$ and $K_2$ are stored in an E²PROM which is shown in FIG. 4 as E²PROM 64. The process then moves to step 76 where the PLC voltage is swept. The method of sweeping the PLC voltage is described below with reference to FIG. 7. Next the process locks in on LIM peak 77. The process then moves to step 78 where the voltage of the PLC monitor is measured. The process then advances to step 80 where the new $V_0$ is calculated from the equation $V_0 = V_{PLCMON} - V_1 T - V_2 T^2 - V_3 T^3$ where $V_{PLCMON}$ is now the measured monitor voltage. The new $V_0$ is stored in E²PROM in step 82 to be used in the subsequent sweeping of the PLC monitor. The process then drops to step 84 where the volts per mode is recalibrated for the gyro. The process of calculating volts per mode is further described in FIG. 8.

Figure 7:
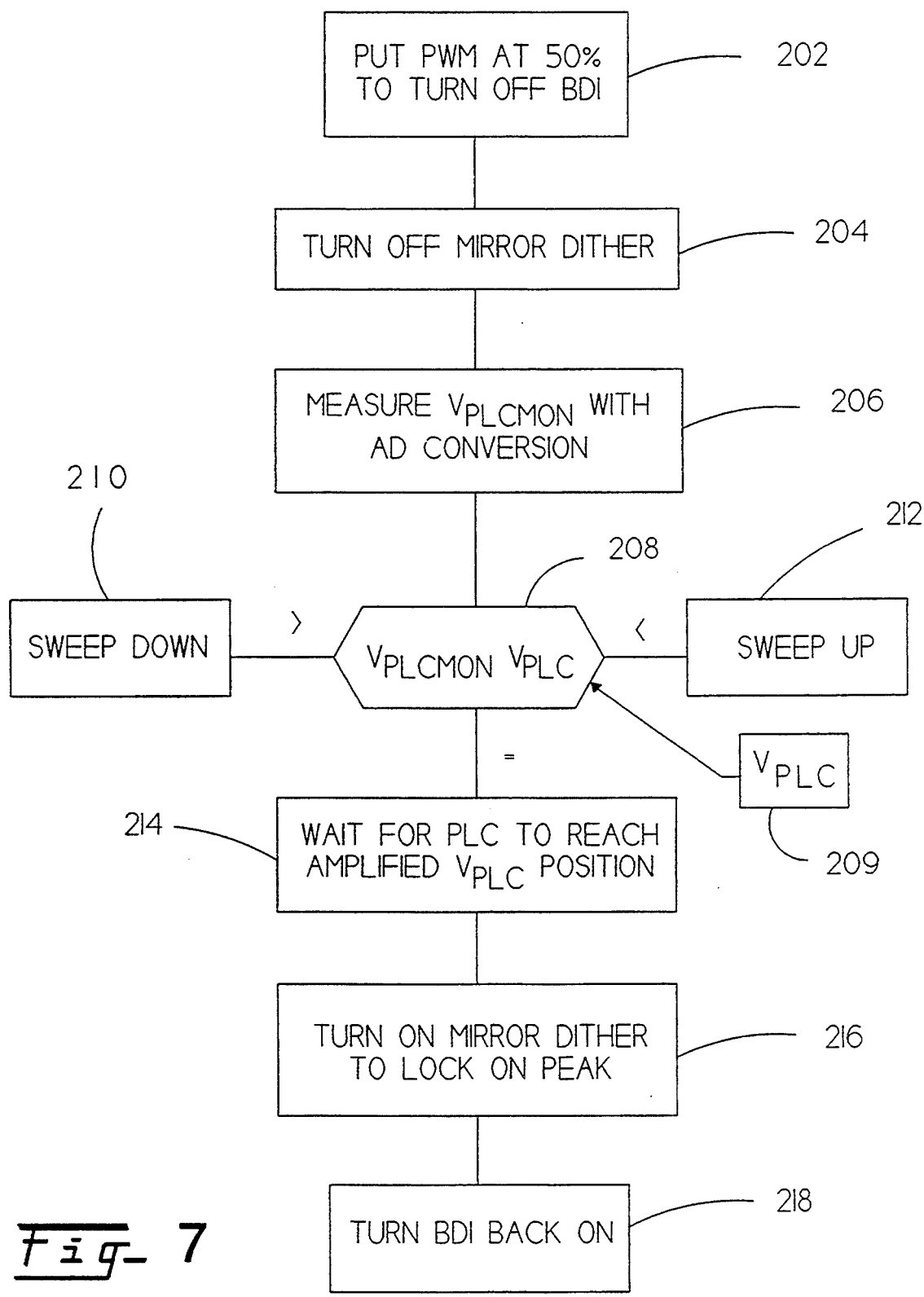
FIG. 7 shows a process flow diagram of the sweep method of the invention.

Now refer to FIG. 7. FIG. 7 shows a flow diagram of the method of the invention to sweep the path length control transducers through a number of modes looking for a mode maximum. The sweep method is used, for instance, in the method of FIG. 6, step 76. The process of FIG. 7 starts by putting the pulse width modulator at 50% to turn off the bias drift improvement signal at step 202. Maintaining the BDI at 50% PWM during mode acquisition and mode hopping is not necessarily a requirement but results in a more accurate volts/mode calculation. The process then proceeds to step 204 where the mirror dither is shut off. This prevents the automatic maximum seeking closed loop apparatus from interfering with the method of FIG. 7. The process then steps to step 206 where the PLC monitor voltage is measured with the A/D converter on the microcontroller 100. The process then steps to 208 where the voltage of the PLC monitor is compared against the desired PLC voltage. The desired PLC voltage is input at step 209. If the PLC monitor voltage measured from the system is greater than the desired PLC voltage, the process continues in step 210 to sweep the PLC voltage down. If the measured voltage is less than the desired PLC voltage, the process steps to 212 where the PLC voltage is swept up. The sweep down and sweep up of the path length controllers are accomplished using the circuit of FIG. 5 where the path length controllers are adjusted accordingly. The process then flows to step 214 where the process waits for the PLC voltage to achieve the specified PLC position, then the $V_{PLCMON}$ voltage equals the requested $V_{PLC}$. Otherwise in both cases of step 212 and 210 the process returns to continuously evaluating the measured voltage from the desired voltage. Once the process has waited for the path length control position to reach the indicated path length control position $V_{PLC}$ the process returns to step 216 where the mirror dither is turned on to lock on the local maximum LIM signal 20. The process then flows to step 218 where the BDI method is enabled.

Figure 8:
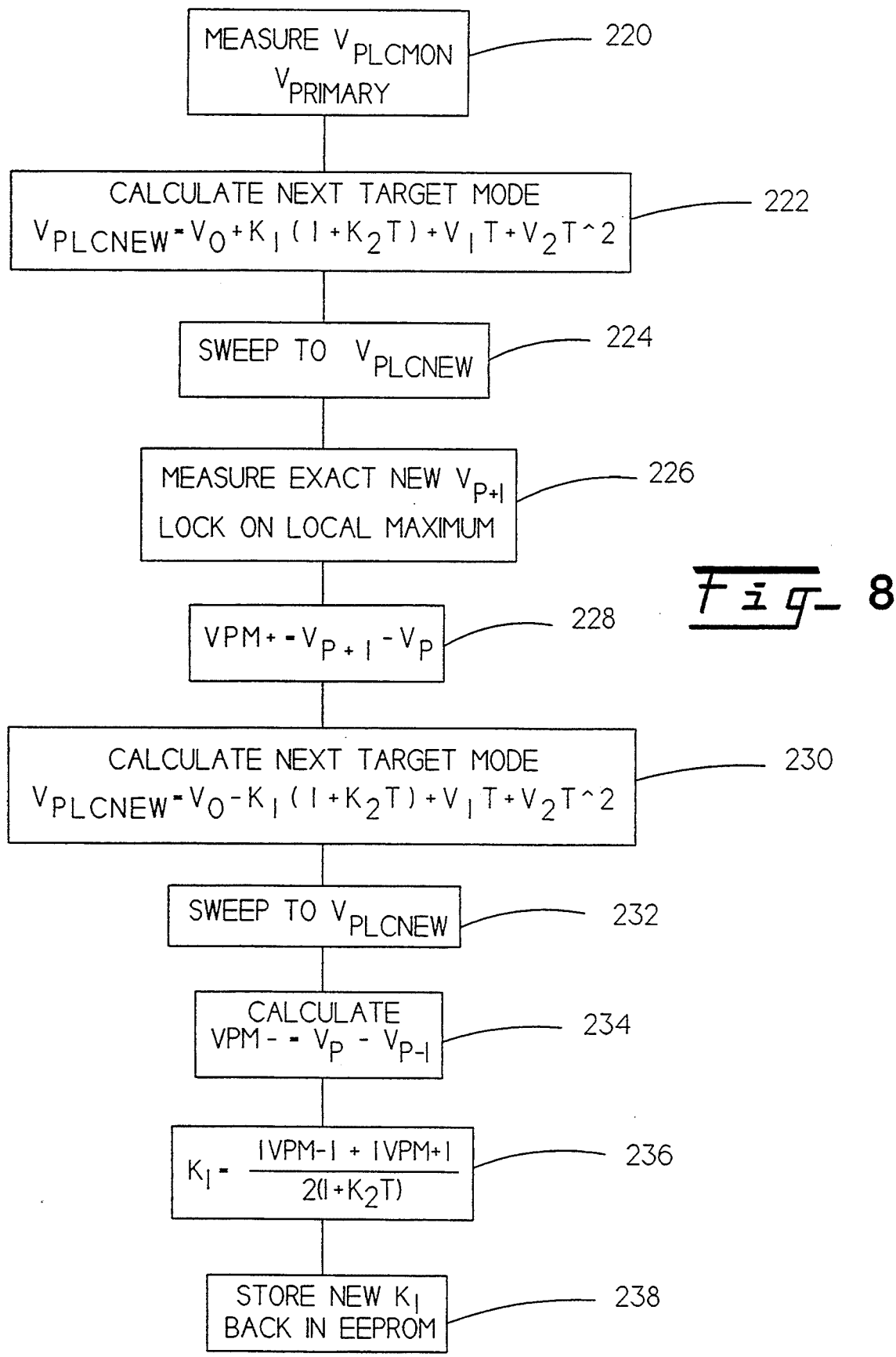
FIG. 8 shows the method of the invention to calculate volts per mode.

FIG. 8 shows a flow diagram of the method of the invention used to calculate the volts per mode of the laser gyro. The process starts by first measuring the path length control monitor voltage at step 220. The process then flows to step 222 where the target mode is calculated as $V_{PLCNEW} = V_0 + K_1 (1 + K_2 T) + V_1 T + V_2 T^2 + V_3 T^3$. The process then steps to step 224 where the laser gyro is swept to the $V_{PLCNEW}$ voltage. The process steps to 226 where the voltages referred to in this method are defined as follows. $V_P$ is the voltage of the path length controller at the primary mode which was found using the methods of FIG. 6. $V_{P+1}$ is the voltage of the path length control monitor at one mode higher than the primary mode, $V_{P-1}$ is the voltage of the path length control monitor at one mode lower than the primary mode. The process step 222 calculates the next target mode as the $V_{P+1}$. In step 226 the exact $V_{P+1}$ voltage is measured. A volts per mode is calculated for the positive direction and the negative direction. The positive volts per mode is called VPM$_+$ and the negative volts per mode is called VPM$_-$. The process then flows to step 228 where the voltage per mode in the positive direction is calculated as the voltage difference of the primary mode $V_P$ and the voltage of the next higher mode to the primary mode $V_{P+1}$. The process then flows to 230 where the $V_{PLCNEW}$ voltage for the new voltage in the negative direction is calculated as $V_0 - K1 (1 + K_2 T) + V_1 T + V_2 T^2 + V_3 T^3$. The process of FIG. 8 then flows to process step 232 where the PLC transducers are swept to $V_{PLCNEW}$ following the method of FIG. 7. The process then flows to process step 234 where the new volts per mode in the negative direction is calculated as the difference between the primary volts of the path length control monitor and the new voltage $V_{P-1}$. In process step 236 the new $K_1$ constant is computed as the absolute value of the negative volts per mode plus the absolute value of the positive volts per mode divided by two times the quantity $1 + K_2 T$. The process then flows to step 238 where the new $K_1$ is stored in the E²PROM 64.

Figure 9:
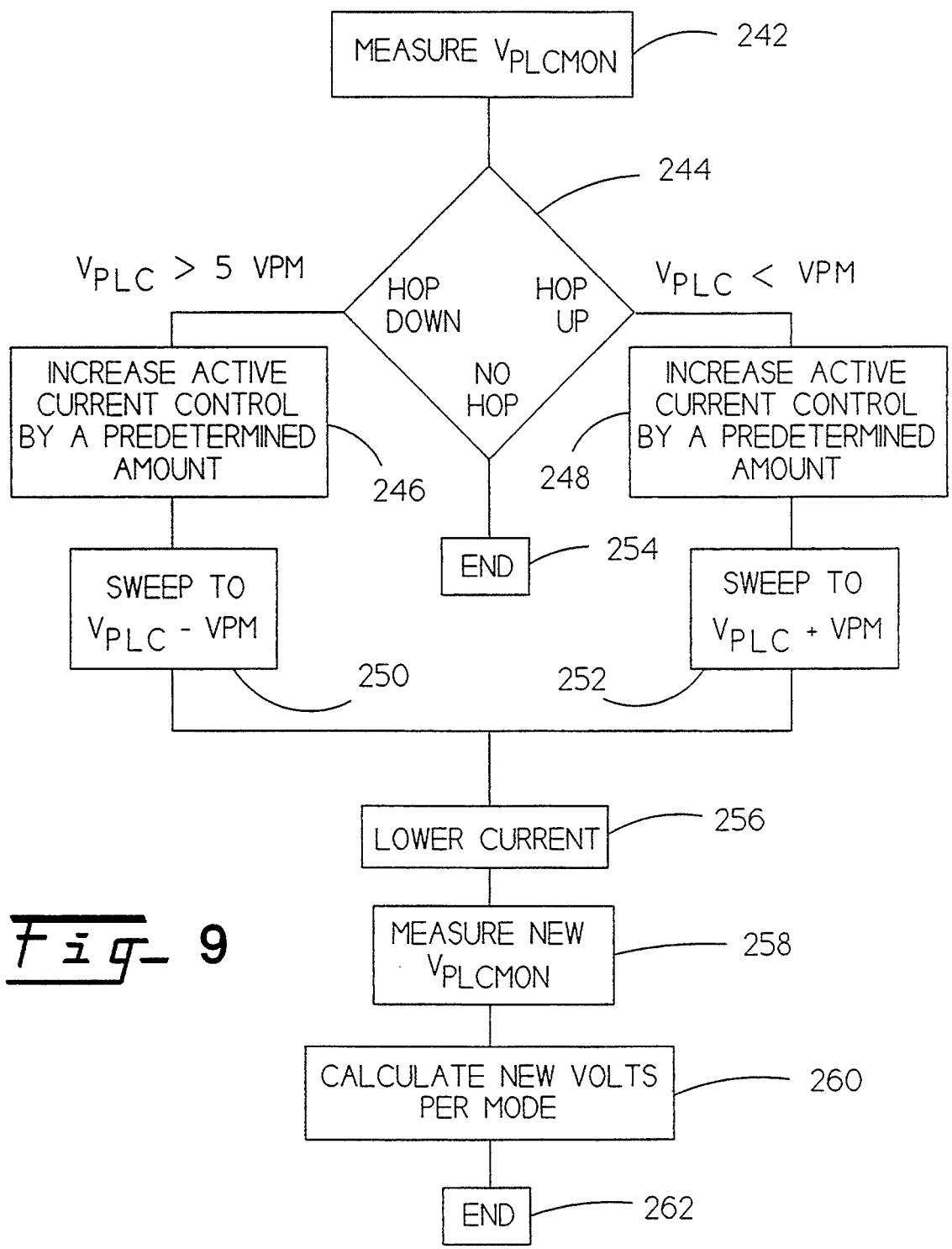
FIG. 9 shows the method of mode hopping of the invention.
Figure 10:
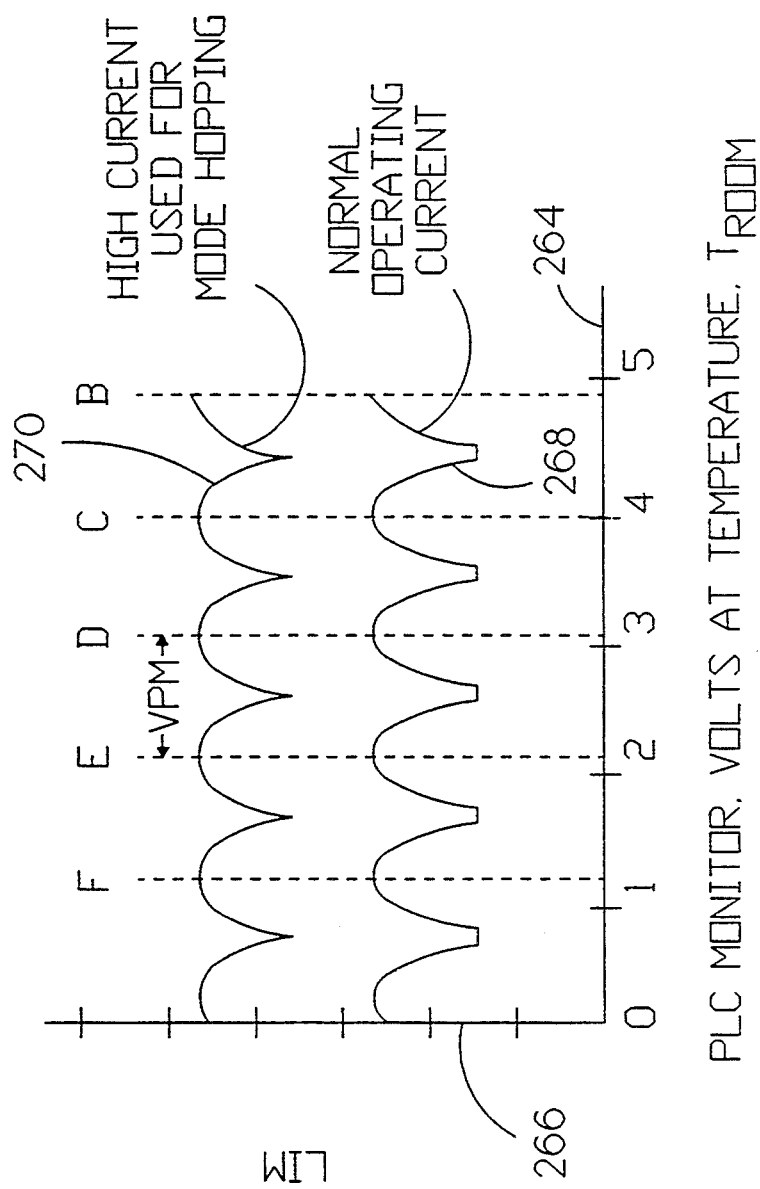
FIG. 10 shows the PLC monitor voltage mode diagram illustrating the LIM signal during mode hopping.

Now referring FIG. 9 which shows a flow diagram of the method of the invention to mode hop the laser gyro through multiple modes as shown in laser gyro mode diagram FIG. 3. FIG. 9 should be read with a view to FIG. 10 where the plot of laser intensity monitor signal 20 is shown for various modes F, E, D, C, and B of the laser gyro mode diagram of FIG. 3. The first step in mode hopping occurs at process step 242 where the voltage of the path length control monitor is measured. The laser gyro operating the mode hopping method of the invention has a maximum and minimum path length control monitor voltage shown in FIG. 3 as 478 and 479 which is used as a limit for the swings of the path length control voltage. The process of mode hopping continues to process decision block 244 where the process forks to a number of different process steps depending on whether the laser gyro using the method of the invention wants to hop down a mode or hop up a mode.

Those skilled in the art will recognize that either the positive volts per mode or negative volts per mode may be used.

The process of FIG. 9 flows to step 254 to end the mode hopping if no mode hopping is desired. For the following discussion VPM is defined as difference between adjacent LIM maximums in turn of PLC monitor volts for one mode and therefor has units of volts. For this example VPM≈1 volt. In one example embodiment of the invention the laser gyro does not have to rehop a mode if either the measured path length control voltage is less than the maximum voltage minus VPM value, or the voltage of the path length control monitor is greater than VPM value. Either of these two conditions indicate that there is no need to mode hop because the laser gyro is currently operating in a comfortable mode. A comfortable mode is a mode that affords a voltage swing within the confines of the operating limits of the gyro. This allows operations such as bias drift improvement and mirror dither to maintain an appropriate mode range. An appropriate mode range is one that does not fall out of the maximum or minimum PLC monitor voltage as the mirrors are dithered or the mirrors are progressed through the bias drift improvement cycle.

The maximum/minimum PLC monitor voltage is arrived at by the specific drive electronics which may vary from alternate embodiments of the laser gyro.

Returning now to decision block 244 for the analysis of the case of a hop down in mode. A hop down in mode occurs when the voltage of the path length control is greater than the maximum voltage minus VPM value. This means that there is no "head room" to swing a mode for BDI. The process of FIG. 9 then flows to step 246 where the active current control current is increased. An increase in active current control is shown on FIG. 10 as an increase in a laser intensity monitor signal 266 from plot 268 to 270. The high energy LIM curve 270 represents the high current used for mode hopping. High current is needed when sweeping modes to insure that the output of the laser intensity monitor is at least as high as the normal mode's operating current maximum, even in the valleys of curve 270. This higher current prevents the loss of any inertial navigation counts from the laser due to a drop off in laser signal because of low signal levels which result in error counts. Increase in active current control is made by a predetermined amount characterized for a particular gyro.

The process then flows to 250 where the path length control voltage is swept to the current voltage minus VPM value. The volts per mode value for the laser gyro is calculated with reference to FIG. 8. The process then flows to step 256 where the current of the active current control is lowered from a level represented by curve 270 to a lower level represented by curve 268, the normal operating current level.

Gyro life time may be extended by lowering the current after mode hopping.

Referring now back to the process step 244 where a hop up is indicated by the path length control voltage being less than the VPM value. This condition indicates that there is no more "bottom room" for the path length controller electronics. The process then flows to step 248 where the active current control is again increased following the steps of 246 to prevent the loss of any laser inertial navigation counts. The process then flows to process step 252 where the path length controller voltage is swept to the new voltage computed as $V_{PLCMON}$ plus VPM value. The sweeping method is shown in FIG. 7. In either case of process step 250 or 252 the process flows to step 256 where the active current control current is lowered. The process then flows to 258 where a new path length control voltage is measured and the process flows to 260 where a new volts per mode is calculated for the new position of the new mode. The process then flows to 262 where the mode hopping has successfully occurred and control is returned to the monitor control loop.

Those skilled in the art will appreciate that mode hopping is useful for environments where the laser gyro system is undergoing large temperature extremes which tend to drive the current operating mode out of the operating range of the laser gyro.

Figure 11A:
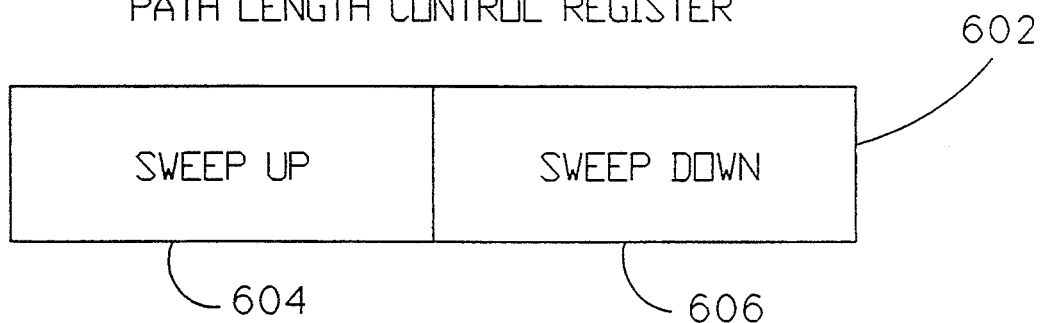
FIGS. 11A and 11B show the sweep up and sweep down bit and its effect on laser mode.

Now referring to FIG. 11A which shows an example of a path length control register 602, In one embodiment of the laser gyro digital path length controller the microprocessor or microcontroller 100 interfaces through a digital register 602 to the path length controller. The path length control register 602 controls the direction of change of the laser path length in the laser gyro 200 to increase mode or decrease mode.

Figure 11B:
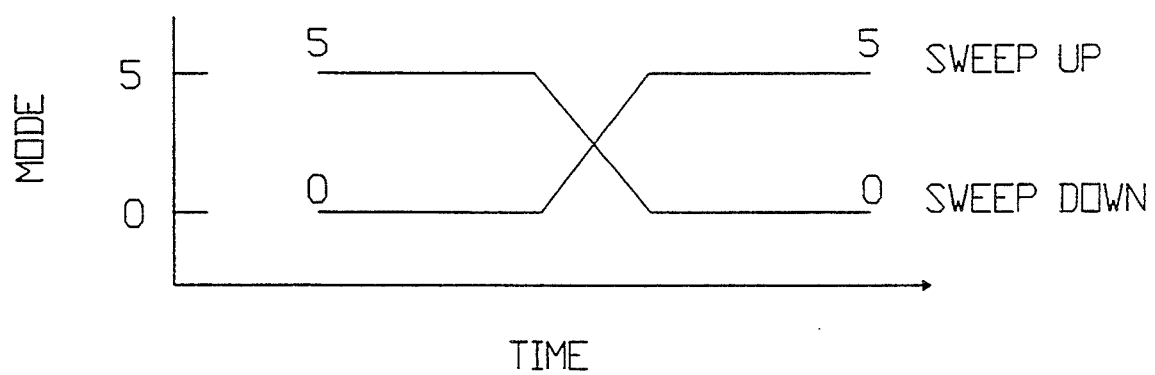

FIG. 11B shows an example of the state transitions possible with S modes of the laser gyro 200. In one embodiment of the invention the path length control register 602 is divided between a sweep up portion 604 and sweep down portion 606. If the direction of change of laser path length is to increase the mode the 'sweep up' portion 604 of the path length control register 602 is active. If the direction of change of laser path length is to decrease the mode the 'sweep down' portion 606 of the path length control register 602 is active. In one embodiment of the invention the path length control register 602 is a gate array register and the 'sweep up' portion 604 and 'sweep down' portion 606 comprise single bits.

In one embodiment of the invention the path length control monitor signal is used with the gate array register to sweep through the modes of the laser gyro 200. In one method the 'sweep down' portion 606 of the gate array register is activated to cause the path length to change in a down direction through lower numbered modes. Mode sweeping terminates when the voltage level from the path length control monitor reaches a predetermined level indicating a predetermined mode number. In an alternate method the path length control monitor is sensed for minimum and maximum values. The occurrence of a periodic change from one maximum to a next lower or upper maximum is defined as a mode. In such an embodiment the number of modes and their corresponding voltage values may be noted and used for subsequent operations.

Figure 13:
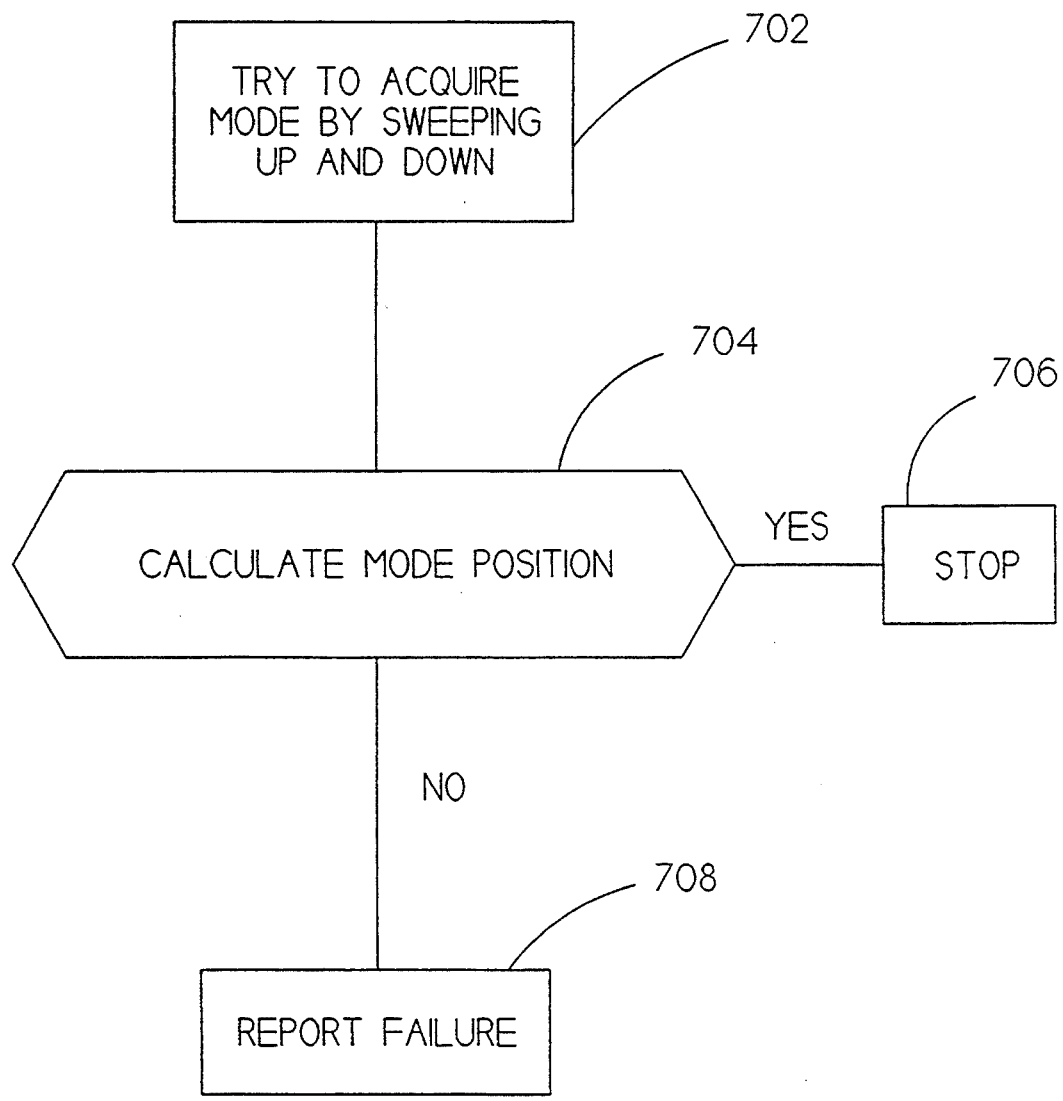
FIG. 13 shows a process flow diagram for one method of acquiring a mode at laser gyro start up.

Refer now to FIG. 13, FIG. 13 shows a method of acquiring a starting mode. At start up the laser gyro must find an operating mode. It is important to pick a mode that provides a full operating range. The method starts by acquiring a mode by sweeping the mode up and down at step 702. In step 704 the mode position is determined. If the mode position is at the desired mode the process stops at step 706. If the desired mode or another close mode cannot be found a failure is reported in step 708.

Figure 14:
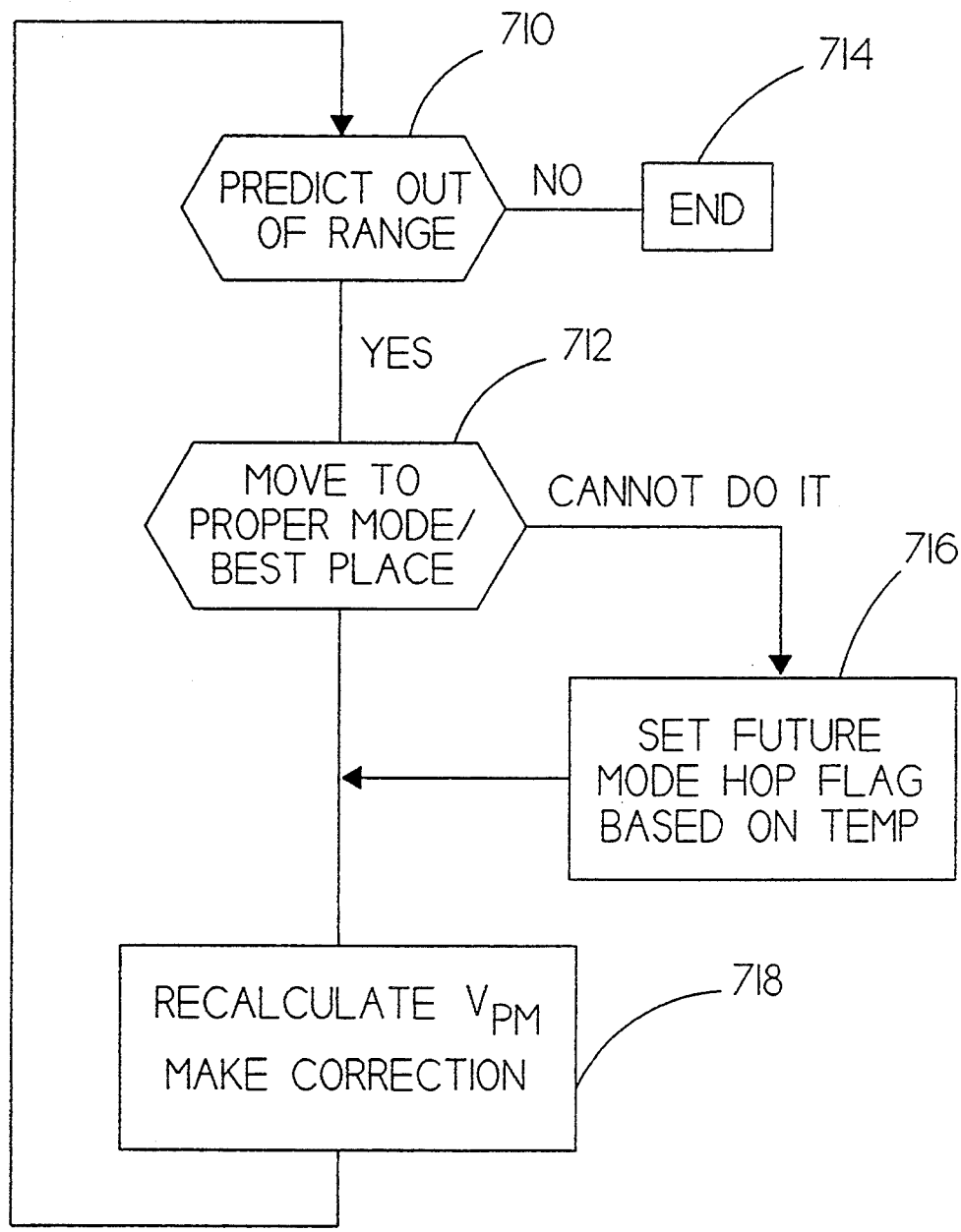
FIG. 14 shows a process flow diagram for one method of predicting whether the gyro will be out of range at a certain mode during the operation of the laser gyro.

Refer now to FIG. 14, FIG. 14 shows a method of predicting whether any selected operating mode will be adequate for the operation of the gyro over a wide temperature range. The process starts at step 710 where the microprocessor predicts, based on the mode curve of the current mode, whether the gyro will be out of range over the operating temperature range of the gyro. If the gyro will not be out of range on the current mode the process stops at step 714. If the gyro will fall out of range while in a mode the process moves the gyro to a better mode if one can be found in step 712. If a better mode cannot be found, the gyro will have to hop a mode while operating. In one alternate embodiment of the invention a mode hop flag may be set in step 716. In another alternate embodiment the gyro may continuously monitor the chance of falling out of range. If the mode is changed the process flows to step 718 to recalculate the volts per mode.

Figure 15:
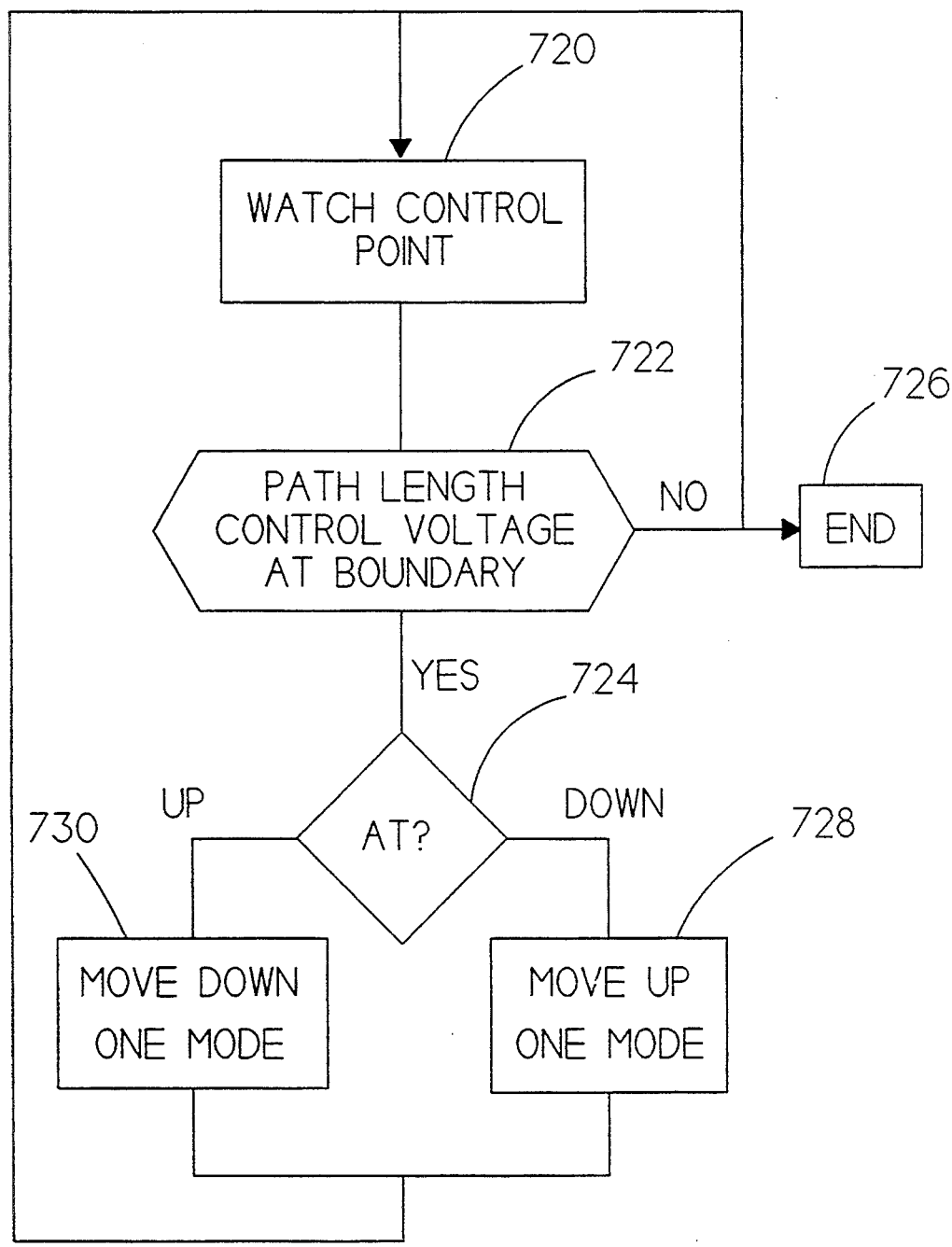
FIG. 15 shows a process flow diagram for mode moving in one embodiment of the invention.

Refer now to FIG. 15, FIG. 15 shows one method of watching a control point to determine whether or not to change modes. The process starts at step 720 to watch a control point, such as path length control voltage. If in step 722 the control point is passed, the path length control voltage moves out of range, the process flows to step 724 to change modes. If in step 722 the control point is not passed the process stops in step 726 or alternately monitors the control point in step 720. The process in step 724 determines if the mode should be change up or down. If the mode is to be moved down the process flows to step 730. Otherwise the process flows to step 728 to move up one mode. The process then returns to monitor the control point in step 720.

Those skilled in the art will recognize that as the mode of operation of the gyro is changed the gyro size changes. As a result the scale factor used to compensate the arcseconds per count of the gyro output need to change. In one example, when the path length changes approximately one wavelength the scale factor changes by 4 ppm and the change in scale factor can be compensated in the microprocessor.

This invention has been described herein in considerable detail in order to comply with the Patent Statutes and to provide those skilled in the art with the information needed to apply the novel principles and to construct and use such specialized components as are required. However, it is understood that the invention can be carried out with specifically different equipment and devices, and that various modifications, both by equipment details and operating procedures, can be accomplished without departing from the scope of the invention itself.

What is claimed is:

1. A laser gyro apparatus having a laser with a laser path length and laser intensity, and first and second path length control mirrors, the laser gyro apparatus comprising:
   (a) a microprocessor means for path length control to provide a synchronous demodulation switching control signal, a mirror dither signal and a sweep signal;
   (b) a monitoring means for monitoring the laser intensity and providing a laser intensity monitor signal;
   (c) an amplification means for amplifying the laser intensity monitor signal and the sweep signal and providing a path length control drive signal;
   (d) a means for synchronously demodulating the path length control drive signal in response to the synchronous demodulation switching control signal to provide a synchronous drive signal;
   (e) a means for integrating the synchronous drive signal to provide a path length control signal wherein the synchronous demodulation switching control signal and the sweep signal are generated by the microprocessor means in response to the path length control signal;
   (f) a mirror positioning means for positioning each one of the at least one path length control mirror in response to the path length control signal, the mirror positioning means further comprising a first mirror transducer and a second mirror transducer;
   (g) a reference voltage supply means supplying a power supply signal of predetermined voltage;
   (h) a compensation transistor connected to the power supply signal to provide a compensation signal;
   (i) a first power transistor connected to the power supply signal and compensation signal to provide a first mirror power signal;
   (j) a second power transistor connected to the power supply signal and compensation signal to provide a second mirror power signal;
   (k) a first first mirror drive transistor connected to the first mirror power signal and to a first side of the first mirror transducer;
   (l) a second first mirror drive transistor connected to the first mirror power signal and to the first first mirror drive transistor and to a second side of the first mirror transducer to provide a differential first mirror drive;
   (m) a first second mirror drive transistor connected to the second mirror power signal and to a first side of the second mirror transducer; and
   (n) a second second mirror drive transistor connected to the second mirror power signal and to the first second mirror drive transistor and to a second side of the second mirror transducer to provide a differential second mirror drive.

2. The laser gyro apparatus of claim 1 wherein the laser further comprises a plurality of modes, the microprocessor means further comprises a path length control register comprising a sweep up portion and a sweep down portion, and wherein the laser path length increases to one of the plurality of modes in response to the sweep up portion and the laser path length decreases to one of the plurality of modes in response to the sweep down portion.

3. The laser gyro apparatus of claim 1 wherein the microprocessor means further includes a path length control monitor signal, wherein the laser gyro apparatus further comprises:
   (a) an analog to digital conversion means for converting the path length control monitor signal into a digital path length control monitor signal; and
   (b) a digital logic means for providing the synchronous demodulation switching control signal and the sweep signal as digital logic level signals.

4. The laser gyro apparatus of claim 1 having at least two path length control mirrors and at least two mirror positioning means.

5. A laser gyro apparatus having a laser with a laser path length and laser intensity, and first and second path length control mirrors, the laser gyro apparatus comprising:
   (a) a microprocessor means to provide a switch signal, a not switch signal, a sweep signal and a mirror dither signal;
   (b) a means for monitoring the laser intensity and providing a laser intensity monitor signal;
   (c) an amplification means for amplifying the laser intensity monitor signal and the sweep signal and for providing a path length control drive signal;

(d) a means for synchronously demodulating the path length control drive signal in response to the switch signal and not switch signal to provide a ramp up drive signal and a ramp down drive signal;

(e) a means for integrating the ramp up drive signal and ramp down drive signal to provide a path length control signal wherein the switch signal and not switch signal and sweep signal are generated by the microprocessor means in response to a path length control signal;

(f) a minor positioning means for each one of the path length control mirror in response to the path length control signal comprising a first mirror transducer and a second mirror transducer;

(g) a reference voltage supply means supplying a power supply signal of predetermined voltage;

(h) a compensation transistor connected to the power supply signal to provide a compensation signal;

(i) a first power transistor connected to the power supply signal and compensation signal to provide a first mirror power signal;

(j) a second power transistor connected to the power supply signal and compensation signal to provide a second mirror power signal;

(k) a first first mirror drive transistor connected to the first mirror power signal and to a first side of the first mirror transducer;

(l) a second first mirror drive transistor connected to the first mirror power signal and to the first first mirror drive transistor and to a second side of the first mirror transducer to provide a differential first mirror drive;

(m) a first second mirror drive transistor connected to the second mirror power signal and to a first side of the second mirror transducer; and (n) a second second mirror drive transistor connected to the second mirror power signal and to the first second mirror drive transistor and to a second side of the second mirror transducer to provide a differential second mirror drive.

6. The laser gyro apparatus of claim 5 wherein the microprocessor means further includes a path length control monitor signal, wherein the laser gyro apparatus further comprises:

(a) an analog to digital conversion means for converting the path length control monitor signal into a digital path length control monitor signal; and (b) a digital logic means for providing a synchronous demodulation switching control signal and the sweep signal as digital logic level signals.

7. The laser gyro apparatus of claim 5 having at least two path length control mirrors and at least two mirror positioning means.

8. A smart mode acquisition method or a laser gyro having a path length control monitor, comprising the steps of:

(a) starting the laser gyro;

(b) measuring a laser gyro temperature;

(c) calculating an expected voltage on the path length control monitor according to a predetermined equation as a function of the laser gyro temperature;

(d) sweeping the laser gyro path length to the expected voltage;

(e) measuring an actual path length control monitor voltage; and (f) acquiring a desired mode when the expected voltage is reached.

9. The smart mode acquisition method of claim 8 wherein the step of acquiring a desired mode further comprises the steps of:

(a) recalibrating a new calibrated expected path length control equation based on the actual path length control monitor voltage; and (b) storing a new calibrated expected path length control equation.

10. The smart mode acquisition method of claim 9 wherein the new calibrated expected path length control equation is $V_0+V_1T+V_2T_2+V_3T_3$ and where $V_0$, $V_1$, $V_2$ and $V_3$ are predetermined initially and $V_0$ is updated as the actual path length control monitor voltage minus $V_1T-V_2T$ and where T is the measured temperature.

11. A method of sweeping a laser gyro path length controller through its range of motion wherein the method of sweeping a laser gyro path length controller comprises the steps of:

(a) measuring a PLC monitor voltage;

(b) comparing the PLC monitor voltage with a desired PLC voltage and adjusting the PLC monitor voltage in a positive direction if the PLC monitor voltage is too low and adjusting the PLC monitor voltage in a negative direction if the PLC monitor voltage is too high; and (c) waiting for the PLC monitor voltage to reach the desired PLC voltage position; and (d) acquiring a desired mode.

12. A mode hopping method of increasing or decreasing a laser mode with a path length controller for a laser gyro having an active current control wherein the path length controller has a path length control voltage, and the mode hopping method is a process comprising the steps of:

(a) measuring the path length control voltage;

(b) determining whether increasing or decreasing the path length control voltage is required in order to reach a desired voltage;

(c) ending the process if a desired mode is a current mode;

(d) increasing the active current control by a predetermined amount;

(e) sweeping down to the desired voltage if it is required to hop down a mode;

(f) sweeping up to the desired voltage if it is required to hop up a mode;

(g) acquiring the desired mode; and (h) lowering the active current control by the predetermined amount.

13. The mode hopping method of claim 12 further including the step of measuring a new path length control voltage.

14. The mode hopping method of claim 12 further comprising the step of calculating a new volts per mode for the laser gyro.

15. The mode hopping method of claim 12 wherein the laser gyro further includes a path length control monitor with a path length control monitor level and wherein a predetermined mode is correlated with a predetermined path length control monitor level.

16. The mode hopping method of claim 15 wherein the laser gyro further including the step of evaluating a control point.

17. A method for mode hopping for a laser gyro with active current control, wherein the laser gyro provides a gyro angle output, where the method for mode hopping comprises the steps of:

(a) controlling the active current control with a microprocessor while mode hopping; and
(b) lowering the active current control while operating in a stable mode to increase gyro life time.

18. The method of mode hopping for a laser gyro of claim 17 wherein the active current control is raised during mode hopping to prevent loss of the gyro angle output.

* * * * *